US005741570A

United States Patent [19]

Seufert

[11] Patent Number: 5,741,570

[45] Date of Patent: Apr. 21, 1998

[54] FILM BLANK FOR PACKAGES

[76] Inventor: Gerhard Seufert, Im Rehwinkel 11, D-63150 Heusenstamm, Germany

[21] Appl. No.: 684,467

[22] Filed: Jul. 19, 1996

[30] Foreign Application Priority Data

Aug. 4, 1995 [EP] European Pat. Off. .............. 95112338

[51] Int. Cl.[6] .............................. B32B 3/28; B29B 7/00; B65D 25/00

[52] U.S. Cl. .......................... 428/167; 428/155; 428/212; 428/542.8; 220/62

[58] Field of Search .................................. 428/156, 172, 428/167, 542.8, 192, 134, 155, 212; 220/62, 416; 229/75; 206/784

[56] References Cited

U.S. PATENT DOCUMENTS

| | | | |
|---|---|---|---|
| 4,064,206 | 12/1977 | Seufert | 264/26 |
| 4,586,650 | 5/1986 | Sasaki et al. | 229/137 |
| 5,302,435 | 4/1994 | Hashimoto | 428/167 |

FOREIGN PATENT DOCUMENTS

| | | |
|---|---|---|
| 176278 | 7/1986 | European Pat. Off. . |
| 563781 | 8/1993 | European Pat. Off. . |

*Primary Examiner*—Donald Loney

*Attorney, Agent, or Firm*—Felfe & Lynch

[57] ABSTRACT

A film blank for packages, especially for folding boxes, has impressed fold lines (BL) in the form of groove-like depressions (5), which extend from a film upper face (3) and at the base of the depressions (5) are closed off from the other film face (4). The base of the depressions (5) has zones (8) of greater depth $T_2$ and zones (9) of lesser depth $T_1$ alternating along its length. For ease of manufacture with close tolerances, smooth running and improved insensitivity to cracking the zones (9) of lesser depth $T_1$, are bounded by circular arcs 10 of radius R at least 1.1 mm the center of curvature (M) of which lies on the other side a line (L) which connects the zones (8) of greater depth $T_2$ together. Preferably, the zones (9) of lesser depth $T_1$ merge with the zones (8) of greater depth $T_2$ at an acute angle "α" from 0° to 60°, and the points (P') where the zones (8) of greater depth $T_2$ and zones (9) of lesser depth $T_1$ meet are rounded concavely.

11 Claims, 6 Drawing Sheets

BL
3
5
4
10
11
T1
T2
(D-T1)
A
B
8
9
G
D
L
M
R
α

5
10
11
A
B
8
9

5
10
11
A
B
8
9

FILM BLANK FOR PACKAGES

BACKGROUND OF THE INVENTION

The invention relates to a film blank for packages, especially for folding boxes, with impressed fold lines in the form of groove-like depressions which extend from one film surface and at the base of the depressions are closed off from the other film surface in which the base of the depressions has zones of greater depth $T_2$ and zones of lower depth $T_3$ alternating along its length.

Known film blanks consist in particular of transparent film of thermoplastics of the group polyethylene terephthalate (PET), polypropylene (PP) and polyvinylchloride (PVC), of which PVC has of late in large measure been dropped on account of its chlorine content on environmental grounds. PET and PP, however, give rise to some additional problems in production, which to date have not been completely mastered.

In the packages, we are concerned preferably, but not exclusively, with a cover, above all, however a folding box. Such packages facilitate sales interest and direct inspection of the contents which together with the packing can be made very decorative.

In folding boxes, which as a rule are supplied flat, stacked, great demands are made of the packing operation, which is carried out with completely automatic packing machines. The initially flat folding boxes are taken off individually from a stack, loaded into the machine and erected so that a space with, for example, a prismatic cross-section is formed. The goods to be packed are now placed in the erected folding box, whereupon it is closed at both ends by flaps or tabs. It is a fundamental requirement that the film material is easily deformable on the fold lines, whilst avoiding deformation of the areas of the film between the fold lines, and that the fold lines produce no substantial restoring forces. Also, the bending or folding process should produce no sharp edges, points or burrs. In the manufacturing process of the cut film, it is moreover to be observed that the deformation of the film in the region of the fold lines does not lead to any unevenness of the areas of film between the fold lines, a process which demands at least a certain displacement of the material.

The films in question usually have a thickness between 0.150 mm and 1.0 mm, the majority of film sections having a thickness between 0.200 mm and 0.400 mm. Usually, the film thickness increases with the size of the package, though this is not always the case.

The substitution of PVC with PET and PP has given rise to substantial difficulties in the manufacture and filling of packages.

U.S. Pat. No. 4,064,206 discloses a thermal process for the production of fold lines, in which fold edge dies, which act as electrodes, are pressed against the film, against an insulating plate and against a counter-electrode. A high frequency is applied to the fold edge dies and the counter-electrode, whereby the film material in the middle and under the fold edge dies is partially melted and displaced to the side under the deforming pressure thereby forming so-called edge beads, which run either side of the bend edges. The known apparatus involves a high investment and running costs on account of the use of high frequency, and also proves to be difficult as regards process control, as the temperature of the fold edge die is controlled only with difficulty in spite of the provision of a controlled cooling plate, and the apparatus occasionally gives voltage fluctuations despite the provision of an insulating plate. This process and apparatus were also primarily developed for working with PVC film.

JP-GM 4-9345 discloses a film bank and also a press tool provided for the same, a so-called fold edge die, in which the zones of greater and lesser depth are connected together at sharp edges by surfaces which are precisely perpendicular to the lengthwise direction of the bend line. This arrangement leads during the bending operation to surface irregularities both on the inner side and on the outer side of the fold lines, which can damage the package contents, and in particular sensitive materials can be damaged if their outer surfaces contact the packing. Particularly affected by this are fine silk materials such as are used for ties. With conventional packing, threads can be pulled out of the silk material. It is significant that a proportion of known packaging is used as gift packaging for ties. Moreover there is noticed a significant risk of breakage with these known fold lines. In this regard it is noteworthy that the areas of film adjacent the fold lines must not just be bent only at 90° to each other, but for purposes of shipping sometimes even at 180° so that areas of film fold flat on each other. In setting up these flat packed folding boxes, this bending about 180° must be bent back through 90°, which is to say that the film material is deformed in both directions on a part of the fold lines by to-and fro-bending. Stress points can be suspected as the cause of rough appearance of the bend line and for the tendency to break, which create sharp edge cuts on the faces and lines.

EP 0 563 781 A1 also has a good look at the disadvantages of the subject matter of JP-GM 4-9345 and proposes as a remedy that the surfaces of the zones of lesser depth be provided with a radius between 0.05 mm and 1.0 mm. The relevant text discloses two versions, namely a first version, in which the zone of greater depth penetrates the full depth of the film thickness, the film being therefore punched through, and a second version, in which the film also in the region of the zones of greater depth has a remanent cross-section. In both cases, however, the transition is sharp-edged in the region of the opposite film surface, and the side faces of the zones of lesser depth run—apart from the radius referred to—perpendicular and sharp-edged to the lengthwise direction of the bend line. Aside from the fact that the effect of a radiussing in the region of 0.05 mm is not really measurable, this known solution still produces substantial roughness in the region of both film surfaces, and also the liability of breakage is not significantly reduced. It is incidentally indicated in the specification referred to that the conditions worsen again beyond a bending radius of 1.0 mm, for example by the occurrence of much higher deforming forces.

SUMMARY OF THE INVENTION

The object of the invention is to provide a film blank above which is easy to manufacture, has modest tolerance requirements with respect to its bending behaviour and high immunity to crack breakage in the fold lines. In particular in this regard the requirement for high frequency should be avoided and the fold lines should run as smoothly as possible on both sides of the film so that there is no snagging of threads, and, further, no damaging deformation should occur in the areas of film between the fold lines.

According to the invention the zones of lower depth $T_1$ are bounded by circular arcs the radius R of which is at least 1.1 mm and whose centre of curvature lies on the opposite side of a line which joins up the zones of greater depth $T_2$.

The radius of the circular arcs is therefore greater than the maximum film thickness concerned, and through the inventive positioning of the centre of curvature M on the other side of the line L, the circular arcs, at their ends, do not run at right angles to the lengthwise direction of the fold lines, but at an acute angle, which can even take the value zero, as will be further explained below.

Through the arrangement or geometry of the fold lines according to the invention, ease of manufacturing is assured, that is to say the pressing process is so to speak self-stabilising with respect to a progressive increase in the pressing forces, so that with respect to the bonding conditions only low tolerance requirements need be observed. The fold lines according to the invention have a high immunity with regard to crack breakage, that is the film areas on both sides of the fold lines can be bent to-and fro-repeatedly by more than 90° without risk of breaking. The particular resistance to penetration of the fold lines is apparent from an attempt to tear the film blank apart along a bend line. The requirement for high frequency can be completely avoided. The fold lines are on both sides of the film extremely smooth, so that thread snagging does not occur even when used with delicate materials such as fine silks. The areas of film between the fold lines also experience no damaging deformation such for example as outward or inward bulging. Nevertheless, the film blanks are easy to bend, without exhibiting any untoward restoring forces, which would be extremely disturbing for processing on automatic packaging machines. In particular the formation of the fold lines according to the invention, also makes the previously problematical processing of PET and PP much easier.

The bending conditions can naturally be influenced by the depths $T_1$ and $T_2$ and their relationship to each other. Thus it is particularly useful if the greater depth $T_2$ amounts to at least 40% and at most 90% of the film thickness D. Furthermore, it is advantageous if the lesser depth $T_1$ is at least 25% of the film thickness D. Attention must naturally be paid to maintaining a thickness difference, which is assured by the use of the stated limiting values.

Naturally, also, the lengths A, $A^1$ and B, $B^1$ of the zones of lesser and greater depth have an influence on the bending conditions of the fold lines. The absolute lengths A and $A^1$ of the zones of greater depth $T_2$ and the absolute lengths B and $B^1$ of the zones of lesser depth $T_1$ can each be chosen to be between 0.5 mm and 5 mm, and the relationship of the length of the corresponding zone of greater depth to the length of the zone of lesser depth can be between 0.5 and 4. With a value less than 1 the lengths of the zones of greater depth are smaller than the lengths of the zones of lesser depth. Conversely, with a value greater than 1 the lengths of the zones of greater depth are greater than the lengths of the zones of lesser depth.

These numerical relations already indicate that the film blank according to the invention is relatively insensitive to variations in the measurements. Already, however, a very useful relationship has been established to be if the length ratio A:B is in the region of 1, the two zones therefore having at least approximately the same length.

According to a further advantageous development of the film blank according to the invention, it is particularly advantageous if the transitions between the zones of greater depth $T_2$ and the zones of lesser depth $T_1$ are concavely rounded. It can be appreciated that, in this way, any stress points that arise in the bonding process, are even further reduced, which improves the properties even further.

DETAILED DESCRIPTION OF THE PREFERRED EMBODIMENT

Figure 1:
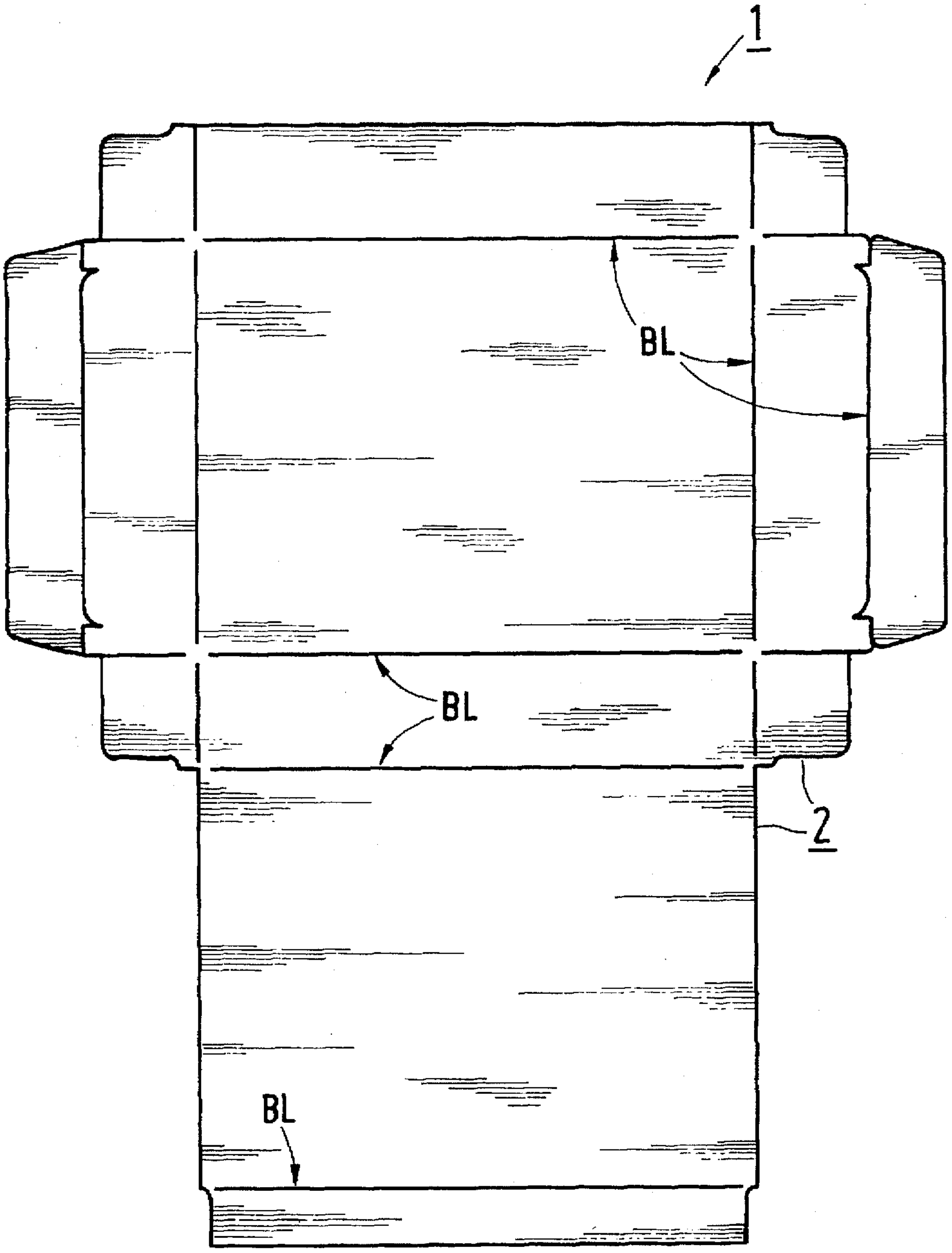
FIG. 1 a laid-flat film blank

In FIG. 1 is shown a film blank 1, which is stamped out of a film along a peripheral stamping line 2. This film blank 1 has quite a number of fold lines BL in cruciform arrangement. Such film blanks with differently formed fold lines are known in the art, so that further description thereof is superfluous.

Figure 2:
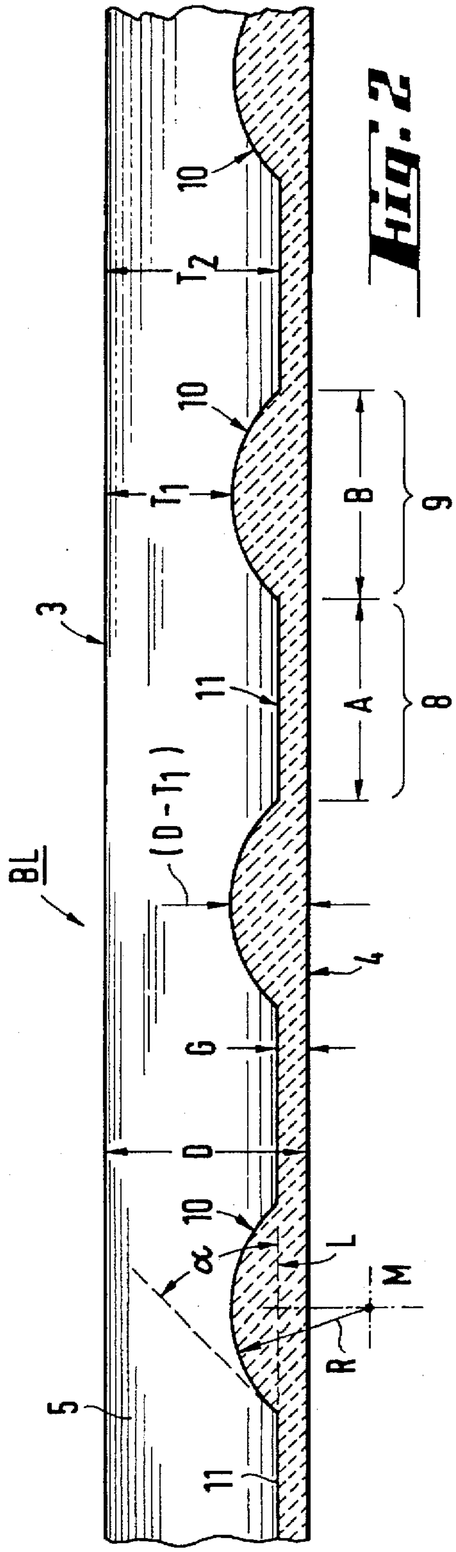
FIG. 2 a lengthwise section through a first embodiment of a fold line.

The fold lines are formed as elongate depressions 5, which, as seem from FIG. 2, extend a first file face 3 and are closed to the opposite second film face 4. As is apparent from FIG. 15, the side walls 6 and 7 stand at an angle β to each other, which can amount to 60°, though this value is not critical.

The base of the depression 5, as seen from FIG. 2, comprises alternate zones 9 of lesser depth $T_1$ and zones 8 of greater depth $T_2$, the lengths of these zones 8 and 9 being shown as A and B, the embodiment according to FIG. 2 having A=B. The zones 9 of lesser depth $T_1$ are bounded by circular arcs 10, while the zones 8 of greater depth $T_2$ are bounded by straight lines 11. The lines 11 all lie on a common line L of which imaginary sections run also through the zones 9.

Figure 14:
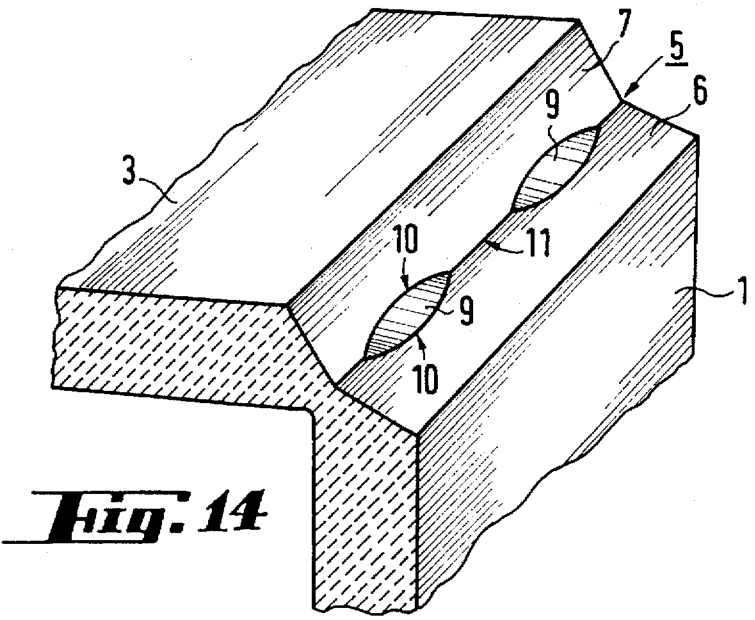
Figure 15:
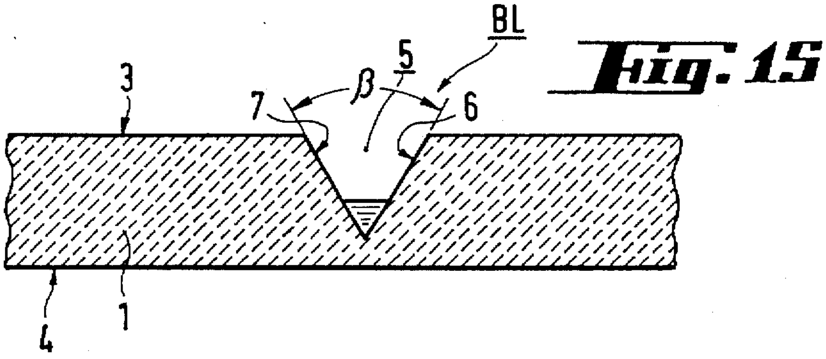

As appears from FIGS. 14 and 15, the zones 9—more strictly speaking—are bounded each by two circular arcs 10, which, as is apparent from FIG. 15, from a section of a cylindrical surface which comes to a point at both ends. By bending into a position as seen in FIG. 14, this cylindrical surface section is naturally deformed, which however it is not important to consider further.

As is seen furthermore from FIG. 2, left hand side, the centre of curvature M lies on the opposite side of the line L which joins together the zones 8 of greater depth $T_2$. The expression "on the opposite side of" refers to a reference point in the film surface 3. In this case the centre of curvature M even lies on the opposite side of the film face 4, also as seen from the film face 3. This means that the ends of the circular arc 10 are inclined at an acute angle α to the line L, this angle, in the embodiment of FIG. 2, amounting to 45°. Depending on the ratio of $T_1$ to $T_2$ and the ratio of A:B this angle α can also take different values, such, for example, as 60°, or it can tend to zero, which will be dealt with further in connection with FIGS. 8 to 10.

Figure 4:
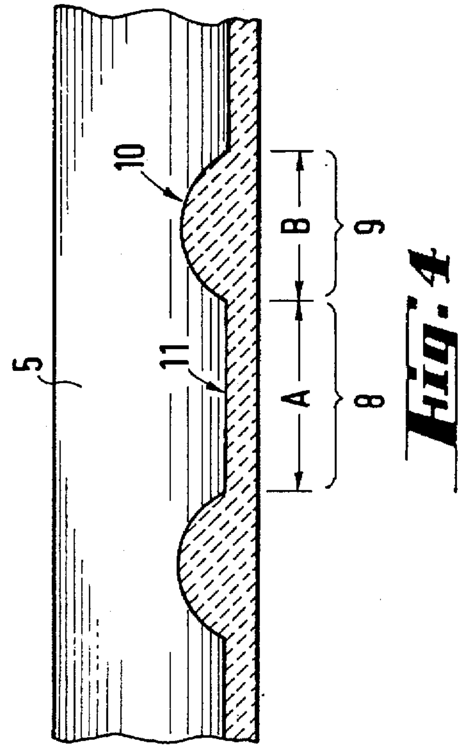
FIG. 4 a second variant of the subject of FIG. 2.
Figure 3:
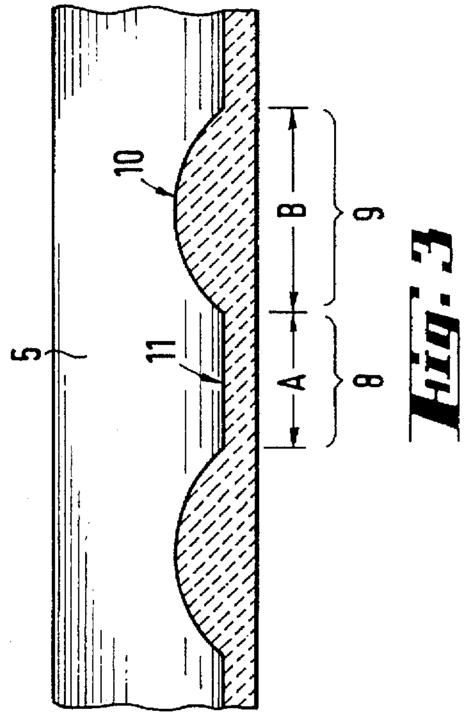
FIG. 3 a first variant of the subject of FIG. 2.

In the embodiment of FIG. 3 the ratio A:B is less than 1, and in the embodiment of FIG. 4, the ratio A:B is greater than 1.

Figure 5:
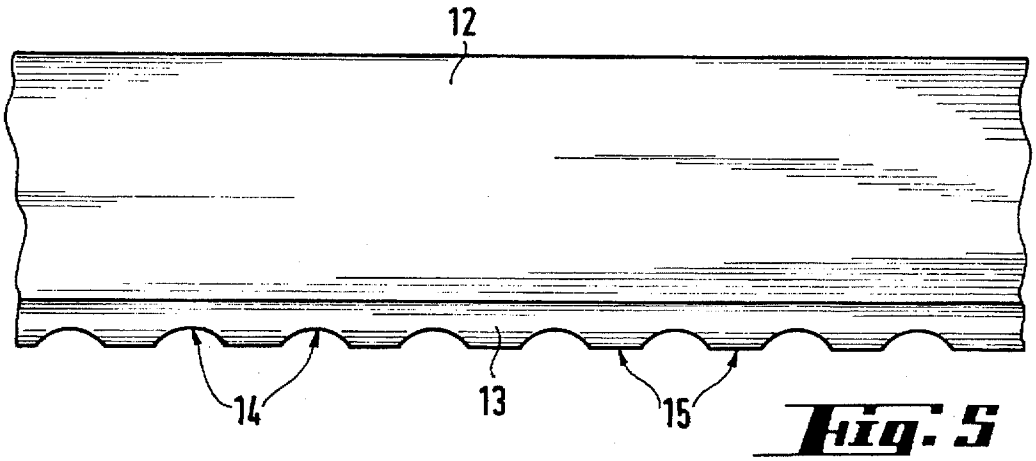
FIG. 5 a side elevating a press tool for the production of a bend edge according to FIG. 2, FIG. 6 a detail of FIG. 5 to a larger scale, FIG. 7 a perspective view of a detail of FIG. 5 to a larger scale, FIG. 8 a lengthwise section through a further variant of a fold line in a view like FIG. 2, FIG. 9 a first variant of the fold line of FIG. 8, FIG. 10 a second variant of the fold line of FIG. 8, FIG. 11 a side elevation of a press tool for the production of the fold line FIG. 8, FIG. 12 a detail from FIG. 11 to a larger scale, FIG. 13 a perspective view of a detail from FIG. 11, FIG. 14 a detail of a film blank folded by 90° with a fold line according to FIG. 2, FIG. 15 a cross-section through a film blank in the region of a fold line, FIG. 16 a detail of a film blank folded by 90° with a fold line according to FIG. 8.
Figure 6:
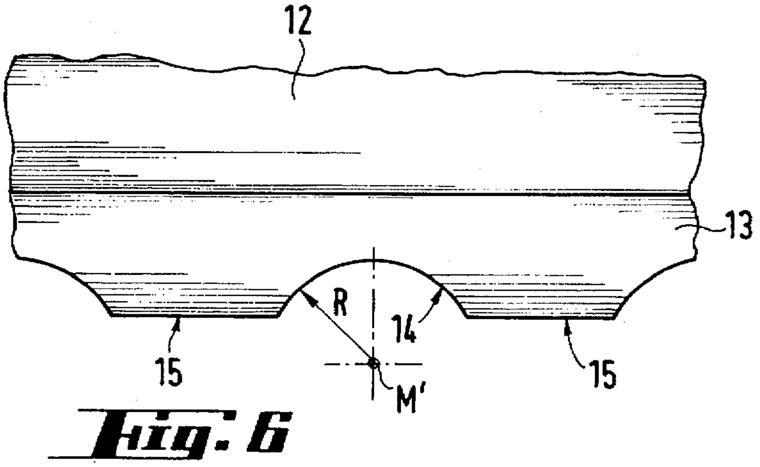
Figure 7:
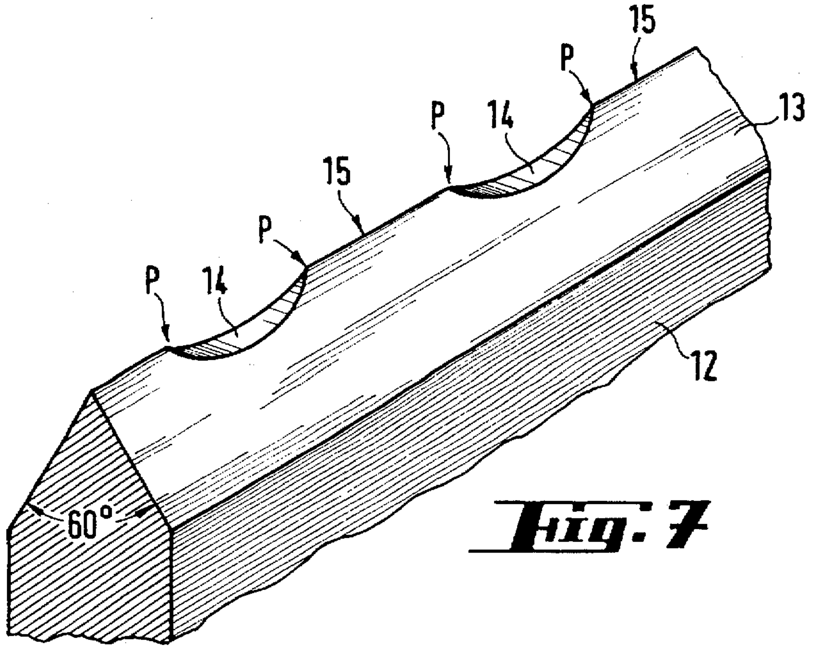

FIGS. 5, 6 and 7 show details of a press tool 12 for the production of fold lines according to FIG. 2. This press tool has in its initial state a cutting edge 13 which is interrupted at regular intervals by sections 14 whose surfaces have a gusset-like section of a cylindrical surface, as is apparent especially from FIG. 7. As can be taken from FIG. 6, the centre of curvature $M^1$ also lies on the opposite side a cutting edge 15, which serves to produce the straight line 11. Naturally the edge 13 is complementary to the fold line shown in FIG. 2, that is to say, the ends of the sections 14 meet the cutting edge 13 in an acute angle, however with the formation of points at the locations indicated by arrow P in FIG. 7.

Figure 8:
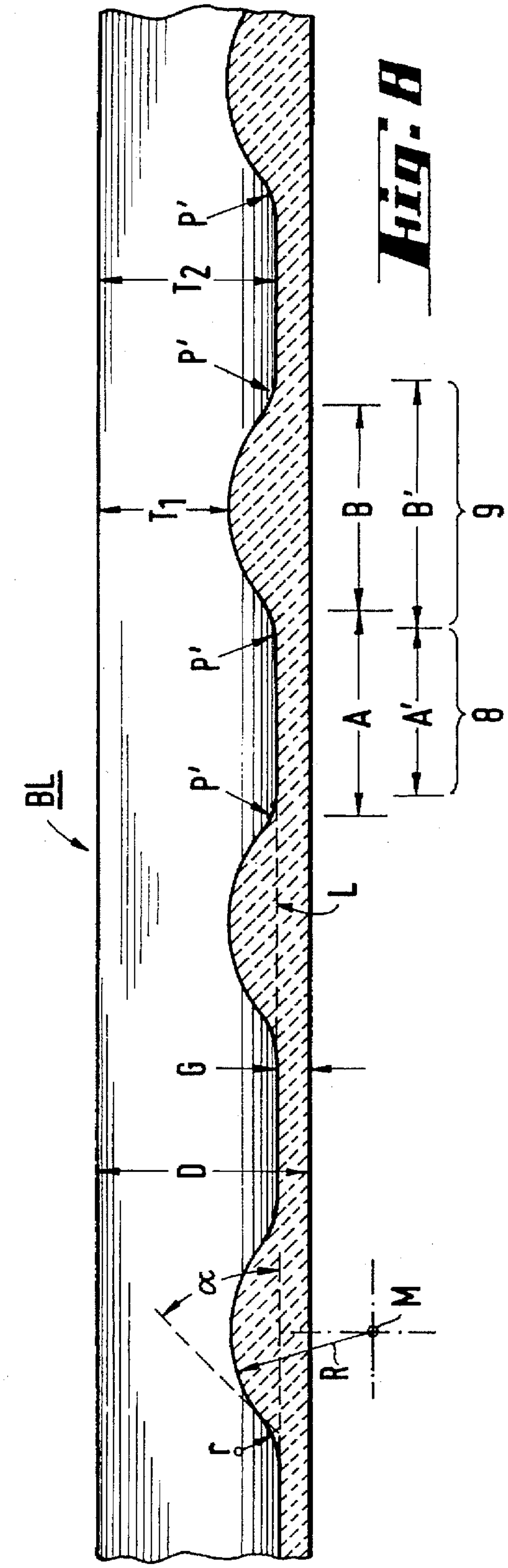
Figure 10:
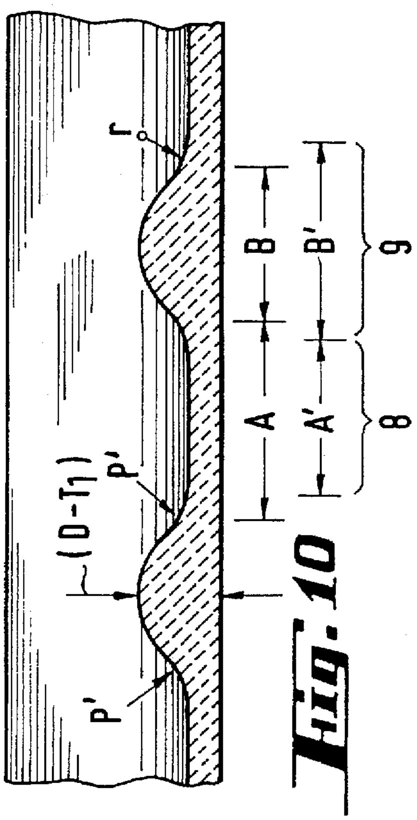
Figure 9:
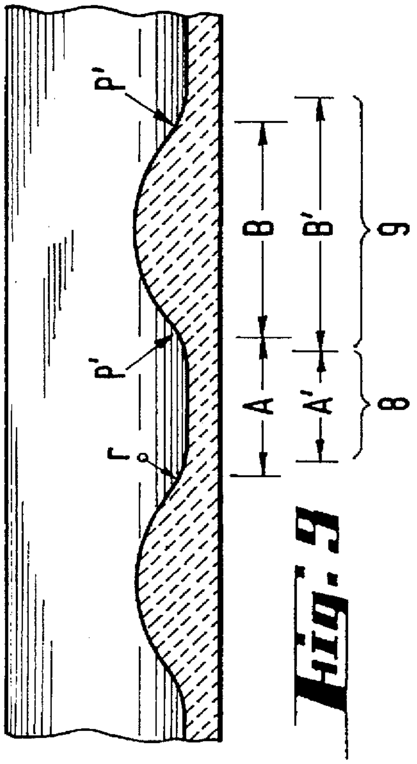
Figure 11:
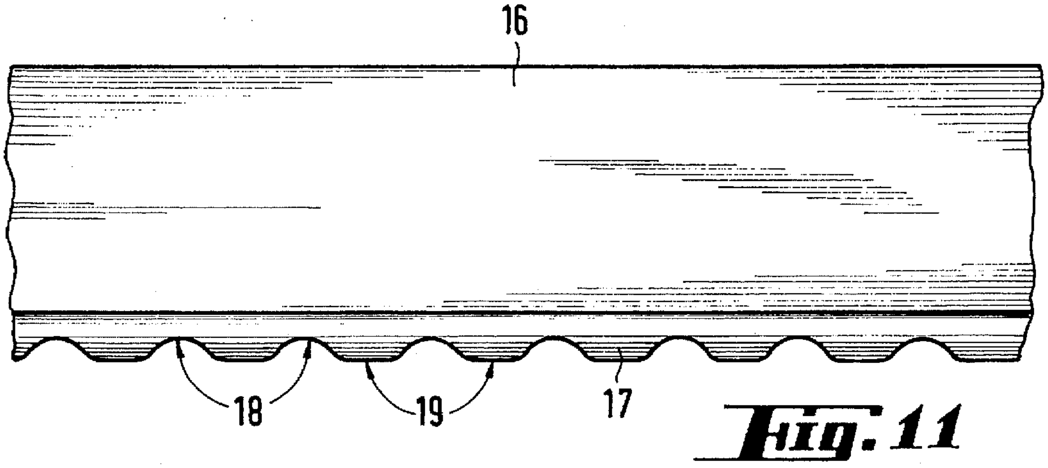
Figure 12:
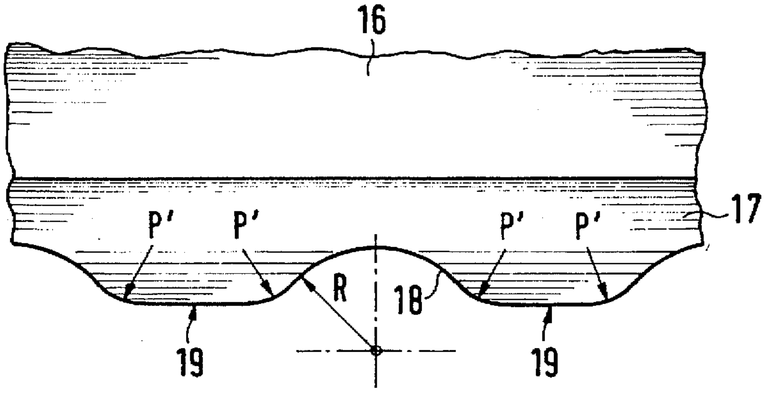
Figure 13:
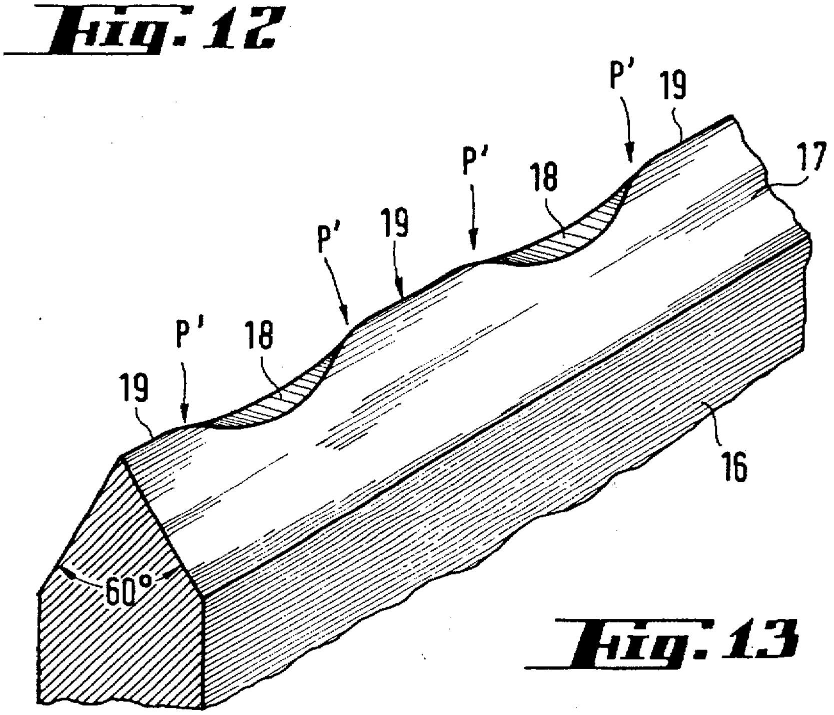
Figure 16:
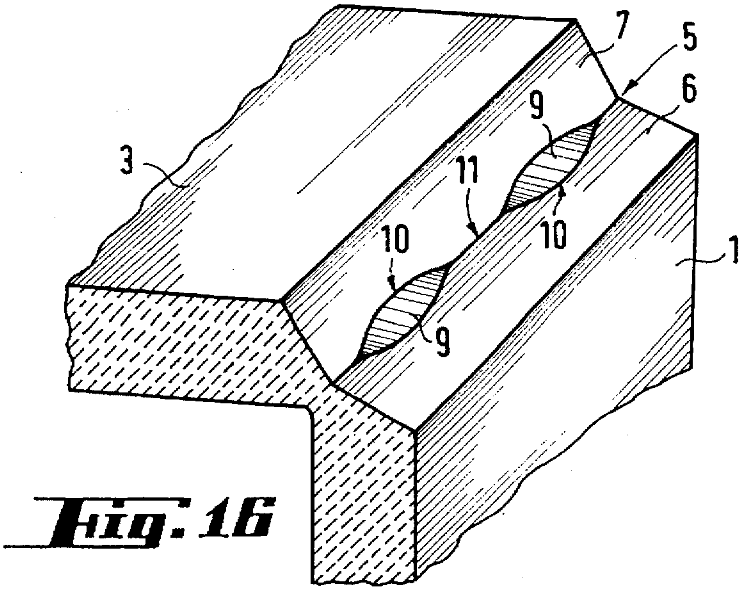

In the embodiment according to FIGS. 8, 9 and 10, the transition $P_1$ between the zone 8 of greater depth $T_2$ and the zone 9 of lesser depth $T_1$ is rounded convexly so that at this position the formation of points is avoided. Through the circular arc-form concave transition at the transitions locations $P^1$, the lengths A to $A^1$—and B to $B^1$ are naturally altered slightly in dependence on the radius of curvature at these positions. This radius of curvature can lie between 0.1 mm and 1 mm. The provision of a fold edge bent by 90° is shown in FIG. 16, that is to say, the ends of the zones 9 of lesser depth $T_1$ blend equally free of edges into the straight line 11. A press tool 16 for the production of fold edges according to FIGS. 8 and 16 is shown in FIGS. 11, 12 and 13. This press tool also has an edge 17 with sections 18 by which a cutting edge 19 is interrupted. It is, however, made particularly visible that at the transition points $P^1$ roundings-off are provided through which the formation of sharp corners is avoided. It can be taken that in this way in the pressing operation local, closely controlled flow processes are facilitated, along also with the avoidance of stress points or internal stresses in the film material. In all cases, test have shown that as a result not only is the pressing operations facilitated, but also the film blank has a better folding ability. The tests have also shown that through such a formation of the press tool the likelihood that the film blank will break under repeated to-and fro- bending is even further reduced.

The following table contains, the most important dimensions of practical film blanks with proven results with corresponding fold lines.

| Data of the fold lines | Film thickness (μm) 200 | 250 | 350 | 600 |
|---|---|---|---|---|
| R (mm) | 1,1 | 1,2 | 1,3 | 3,0 |
| $T_1$ (μm) | 50 | 80 | 165 | 380 |
| $T_2$ (μm) | 175 | 220 | 315 | 540 |
| $D - T_2 = G$ (μm) | 25 | 30 | 35 | 60 |
| $D - T_1$ (μm) | 150 | 170 | 185 | 220 |
| A (mm) | 1,1 | 1,4 | 1,2 | 2,4 |
| B (mm) | 1,0 | 1,2 | 1,2 | 1,8 |
| A:B | 1,1 | 1,17 | 1,0 | 1,33 |

I claim:

1. Film blank for packages, said blank comprising a first film face (3) and a second film face (4) with a film thickness D therebetween, said blank having impressed fold lines (BL) in the form of elongate depressions (5), which extend into said first film face (3) and are closed to the second film face (4), in which the depressions (5) each have a base which comprises alternately along its length zones (8) of greater depth $T_2$ and zones (9) of lesser depth $T_1$ wherein the zones (9) of lesser depth $T_1$ are bounded by circular arcs (10) each having a radius R of at least 1.1 mm and a center of curvature (M) which lies on the opposite side of a line (L) which joins the zones (8) of greater depth $T_2$.

2. Film blank according to claim, wherein the greater depth $T_2$ amounts to at least 40% and at most 90% of the film thickness D.

3. Film blank according to claim 1, characterised in that the smaller depth $T_1$ amounts to at least 25% of the film thickness D.

4. Film blank according to claim 1, wherein the zones (8) of greater depth $T_2$ each have a length between 0.5 and 5 min.

5. Film blank according to claim 1, wherein the zones (9) of lesser depth $T_1$ each have a length between 0.5 and 5 min.

6. Film blank according to claim 1, wherein the ratio of the lengths of the zones (8) of greater depth $T_2$ to the lengths of the zones (9) of lesser depth $T_1$ is between 0.5 and 1.

7. Film blank according to claim 1, wherein the ratio of the length of the zones (8) of greater depth $T_2$ to the lengths of the zones (9) of lesser depth $T_1$ is between 1 and 4.

8. Film blank according to claim 1, wherein the zones (9) of lesser depth $T_1$ meet the zones (8) of greater depth $T_2$ in an acute angle "α" from 0° to 60°.

9. Film blank according to claim 1 wherein the zones (8) of greater depth $T_2$ and the zones (9) of lesser depth $T_1$ meet at transition points ($P^1$) which are convexly rounded.

10. Film blank according to claim 9, wherein the transition points ($P^1$) have a radius of curvature between 0.1 and 2 mm.

11. Film blank according to claim 1 wherein the film thickness D is between 200 and 400 μm and the difference (D-$T_1$) between the thickness D and the depth $T_1$ is between 120 and 200 μm.

* * * * *

UNITED STATES PATENT AND TRADEMARK OFFICE

CERTIFICATE OF CORRECTION

PATENT NO. : 5,741,570

DATED : April 21, 1998

INVENTOR(S) : Gerhard SEUFERT

It is certified that error appears in the above-identified patent and that said Letters Patent is hereby corrected as shown below:

In column 2, line 54, delete -- above --.

In column 4, line 40, change "extend a first file" to -- extend into a first film --.

In column 5, line 46, change "comers" to -- corners --.

In Claim 2, column 6, line 27, after "claim" add -- 1 --.

Signed and Sealed this

Eighteenth Day of January, 2000

Attest:

Q. TODD DICKINSON

*Attesting Officer* *Commissioner of Patents and Trademarks*